(12) United States Patent
Bonfert et al.

(10) Patent No.: US 7,419,460 B2
(45) Date of Patent: Sep. 2, 2008

(54) MACHINE TOOL WITH WORK PIECE HANDLING ARRANGEMENT

(75) Inventors: Heinrich Bonfert, Dettingen (DE);
Georg Deponte, Schwaigern (DE);
Wolfgang Märker, Linsenhofen (DE);
Michael Herkert, Hassmershausen (DE)

(73) Assignee: Gebr. Heller Maschinenfabrik GmbH, Nürtingen (DE)

( * ) Notice: Subject to any disclaimer, the term of this patent is extended or adjusted under 35 U.S.C. 154(b) by 235 days.

(21) Appl. No.: 11/363,309

(22) Filed: Feb. 27, 2006

(65) Prior Publication Data
US 2007/0179033 A1 Aug. 2, 2007

(30) Foreign Application Priority Data
Jan. 14, 2006 (DE) .................. 20 2006 000 543 U

(51) Int. Cl.
*B23Q 3/155* (2006.01)
*B23Q 7/14* (2006.01)
*B23C 1/00* (2006.01)
*B23C 3/08* (2006.01)
*B65G 57/00* (2006.01)

(52) U.S. Cl. ............................. 483/14; 483/20; 29/56.5; 29/27 C; 29/6.01; 409/134; 409/172; 409/200; 414/788.7; 414/416.07

(58) Field of Classification Search .................. 483/14, 483/16, 17, 18, 19, 20; 29/56.5, 6.01, 27 C, 29/27 R; 409/134, 172, 189, 190, 199, 200, 409/135; 82/106; 414/788.7, 416.07, 795.8
See application file for complete search history.

(56) References Cited

U.S. PATENT DOCUMENTS

| 3,795,161 | A | * | 3/1974 | Berbalk ..................... 82/106 |
|---|---|---|---|---|
| 4,171,654 | A | * | 10/1979 | Kreucher .................... 82/106 |
| 4,180,359 | A | * | 12/1979 | Schmid ...................... 409/199 |
| 4,208,156 | A | * | 6/1980 | Kralowetz et al. .......... 409/200 |
| 4,619,565 | A | * | 10/1986 | Schmid et al. .............. 409/199 |
| 4,790,698 | A | * | 12/1988 | Heffron ...................... 409/200 |
| 5,127,140 | A | * | 7/1992 | Oiwa et al. ................. 29/27 C |
| 5,275,072 | A | * | 1/1994 | Schmid et al. ............... 82/106 |
| 5,707,187 | A | * | 1/1998 | Arnold ....................... 409/200 |
| 6,098,258 | A | * | 8/2000 | Shimomura ................. 29/27 C |
| 6,340,282 | B1 | * | 1/2002 | Bar et al. .................. 414/788.7 |
| 2002/0108836 | A1 | * | 8/2002 | Jaeger ...................... 198/339.1 |
| 2004/0226257 | A1 | * | 11/2004 | Jaeger ....................... 52/749.1 |

* cited by examiner

*Primary Examiner*—Dana Ross
(74) *Attorney, Agent, or Firm*—R. S. Lombard; K. Bach

(57) ABSTRACT

In a machine tool arrangement comprising a machine tool component including a mounting structure for a work piece to be machined by a suitable metal cutting tool, a housing enclosing the machine tool component, a horizontal support beam is disposed above the housing and carries handling equipment for supplying work pieces from an adjacent loading area to the machine component for machining and returning the finished work pieces to the storage structure and an intermediate storage structure is disposed near the machine tool component for temporarily storing unfinished work pieces to be machined and finished work pieces after being machined.

20 Claims, 4 Drawing Sheets

MACHINE TOOL WITH WORK PIECE HANDLING ARRANGEMENT

BACKGROUND OF THE INVENTION

The invention relates to a machine tool and a work piece handling arrangement associated therewith.

Machine tool work pieces which must be supplied to the machine tool and again removed therefrom for which loading devices are used. Furthermore, tools need to be replaced occasionally, that is, the old tools have to be moved out of the working space of the machine tool and new tools must be brought into the working space. For both, there are handling devices, wherein particularly the device for supplying the work pieces to the machine tool make it possible to integrate the machine tool into the flow of parts for an assembly line.

DE 195 00 652 C1 discloses a machine tool which has a work piece handling device which is set up at one side of the machine tool. It is in the form of a portal which is disposed in front of the machine tool and on which a carriage is supported which is movable horizontally toward, and away from, the machine tool. The carriage has arms which are supported thereon so as to be movable about a horizontal axis, the arms carrying each at its free end a work piece holder. The work piece holders are adapted to handle work pieces or other parts. This solution however requires a large set-up area.

DE 103 48 223 B4 discloses a machine tool with a handling device which includes a pivot arm. The pivot arm is supported by a vertical carriage which is horizontally movably supported on a portal disposed in front of the machine tool.

A portal with a carriage movably supported thereon and with a pivot arm pivotally supported on the carriage is also known from DE 198 24 014 B4. The arrangement shown in this publication however also requires a relatively large set-up area.

Finally, DE 102004037379 A1 discloses a machine tool with an integrated loading device. The loading device is guided by an upper and a lower horizontal back and comprises among others a telescopic tool holder which is supported pivotally about a horizontal axis.

However, the integration of the loading device into the machine tool represents a substantial limitation with regard to the machine design.

It is therefore the object of the present invention to provide an improved machine tool arrangement.

SUMMARY OF THE INVENTION

In a machine tool arrangement comprising a machine tool component including a mounting structure for a work piece to be machined by a suitable metal cutting tool, a housing enclosing the machine tool component, a horizontal support beam is disposed above the housing and carries handling equipment for supplying work pieces from an adjacent loading area to the machine component for machining and returning the finished work pieces to the storage structure and an intermediate storage structure is disposed near the machine tool component for temporarily storing unfinished work pieces to be machined and finished work pieces after being machined.

The machine tool according to the invention includes a machine component and a loader which includes a horizontal support beam extending over a housing surrounding the machine tool. The horizontal carrier serves as support and guide track for the work piece handling means which in the form of loaders transport the work piece or, in the form of a crane provide for the transport of the work piece or some other structure.

As the horizontal support beam is disposed on top of the housing, the portal normally extending over the machine tool and the housing is not necessary. The required set up area is reduced and the technical expenditures with regard to the manufacture and construction of the machine tool arrangement or, respectively, the machining setup, are lowered. Furthermore, the chances for faulty mounting and faulty alignments are reduced. The correct position of the horizontal beam is provided by the tool manufacturer. Furthermore, the supply of the work pieces to the machine tool is more precise. The horizontal beam is spatially supported by the housing, whereby the vibrations and oscillation of the horizontal beam are reduced—in comparison with portals whose horizontal beams are supported at their opposite ends by (relatively high) columns.

Principally, the horizontal beam disposed on top of the machine tool arrangement may be supported on the housing surrounding the machine tool or, alternatively, it may be supported directly by the machine tool. Preferably the horizontal beam is supported by the housing which is reinforced to accommodate the weight of the beam. Together with the housing, therefore, the support base for the mounting of the horizontal beam is provided, which advantageously may merely be disposed on the housing walls.

The housing is preferably a casing which is not part of any machine component, but is set up separately. This prevents the transmission of vibrations between machines components, the loader and the housing.

The horizontal beam is preferably at least so long and so arranged that it extends, at least at one end beyond the housing wall. Below the one end of the horizontal beam which extends beyond the housing, a loading or storage berth may be arranged. This makes it possible for a pick-up arm mounted on a carriage which is movably supported on the horizontal beam to move between a loading position above the machine component or the operating space thereof in order to transport parts such as work pieces between the two locations above the housing. Preferably the pick-up arm is supported pivotally about a horizontal axis and is provided at its free end with a work piece grasper. In a preferred embodiment, the pivot arm is angled at an obtuse angle. With this configuration, the loading and unloading locations below the horizontal beam can be safely reached and only a relatively low ceiling height is required.

It has further been found that within an arrangement in which the horizontal beam extends over the machine component and the work piece holder or grasper supported thereon, it is advantageous to provide near the working space of the machine components above the housing and preferably below the horizontal beam an intermediate work piece storage structure.

The intermediate work piece storage structure may be a support member or frame which is movable transverse to the horizontal beam. The work piece grasper then moves into, and out of, the working space only carrying a single work piece. For example, it picks up a finished work piece in the working space and deposits it on the intermediate storage structure and picks up the next unfinished work piece and transports it from the intermediate storage structure onto the working space. In this way, the work piece pick-up arm needs to move only over short travel distances.

When the machining of the work piece in the machining space is initiated, the pick-up arm moves to again pick up a finished work piece from the intermediate storage structure and moves it to a loading area and picks up a new unfinished work piece in the loading area and moves it to the intermediate storage structure. In this way, the pick-up arm utilizes the time required for the machining of the work piece, in which the pick-up arm is normally resting, for the transport of the work piece over a longer distance. In this way, the machine loading and unloading times can be substantially reduced.

It is advantageous in this connection, if the intermediate work piece storage structure extends at a right angle to the horizontal beam and itself is horizontally movable. In this way, the number of pivot axes required for the pick-up arm can be minimized. It is sufficient if the pick-up arm carriage is horizontally movable and the pick-up arm is pivotable about a horizontal axis. The pivot arm of the handling structure actually requires no joint, that is it may be a stiff arm. Preferably, the work piece grasper dispersed at the free end of the pick-up arm is provided with a parallel guide structure. No further pivot axes or axes of rotation or linear movement arrangements are required. With such an arrangement the work pieces can be exchanged rapidly and accurately.

It is furthermore considered to be very advantageous, if a manually operable crane is disposed on a beam extending above the housing for the machine tool, such that the crane can move along the horizontal beam and can move between a machine-oriented position and a remote outside position. The machine-oriented position is above the operating space of the machine component. The remote outside position is about above the loading area. The crane has a hoist arm which extends preferably rigidly from the carriage. It may be provided with one or several joints, each having a vertical pivot axis. The joints are preferable not provided with drives but are manually freely operable.

The crane may be used for moving individual heavy work pieces and also tools into, and out of, the working area of the machine components. For example, the tools required for internal milling of round openings are generally so heavy that they can not be manually exchanged but require a crane for that purpose. The horizontal beam disposed above the working space can therefore perform a double function, it manually supports the work piece transport device and it also forms the support structure for the crane. It this way, a compact machine arrangement is obtained which is easy to set up, which provides for rapid work piece exchange and which facilitates a comfortable manual tool change-over.

Details of the invention will become more readily apparent from the following description of a particular embodiment thereof on the basis of the accompanying drawings.

DESCRIPTION OF A PARTICULAR EMBODIMENT

Figure 1:
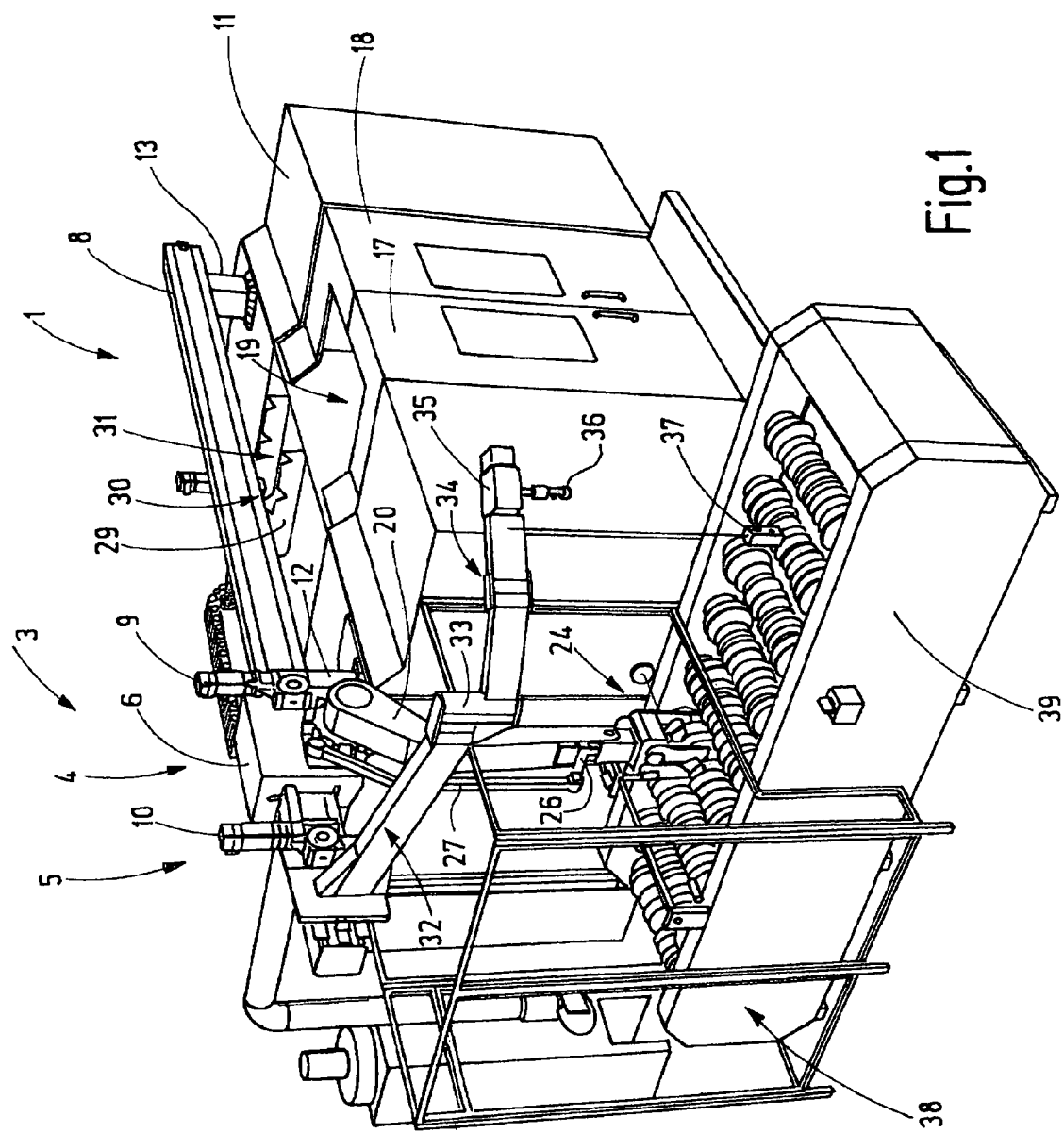
FIG. 1 shows in a perspective representation a machining arrangement according to the invention.
Figure 5:
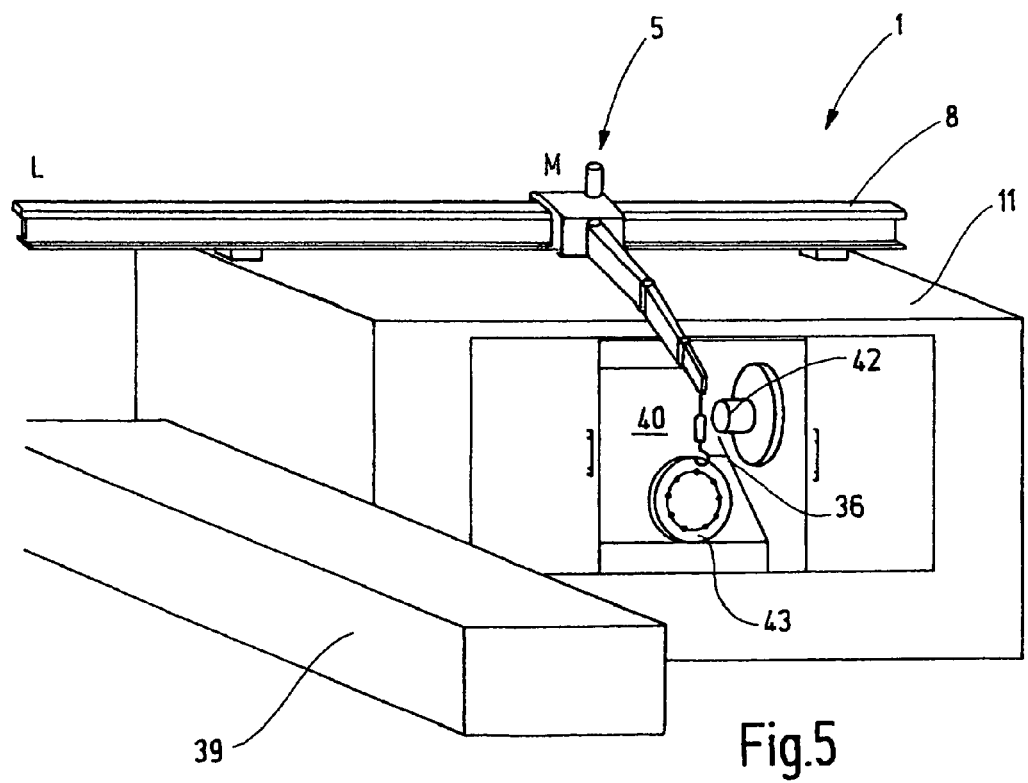
Figure 6:
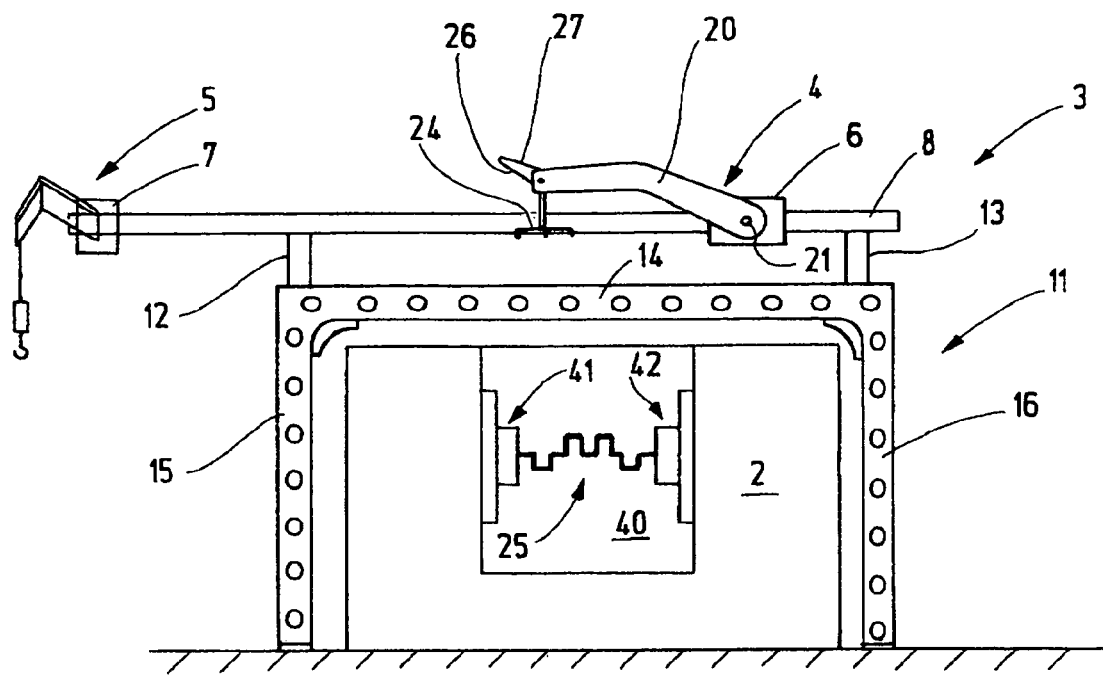
FIG. 6 shows the machining arrangement of FIG. 1 schematically in sectional view; and, FIG. 7 is a highly schematic top view of the machining arrangements of FIG. 1 for the explanation of a work piece change.

FIG. 1 shows a machine tool arrangement including a machining structure 1 which comprises a machine component 2 as schematically shown in FIG. 6, for example, in the form of an internal round cylinder cutting machine or another machine for the cutting of work pieces and a transport device 3, for example, a loader 4 for moving work pieces and/or a crane 5 for transporting large tools or work pieces. The loader 4 and the crane 5 include each a carriage 6, 7. The carriages 6, 7 are supported on a common horizontal support beam 8 and movable horizontally between a machine position M and an outer or loading position L (FIG. 5). They are provided with drive units 9, 10, for example servo motors. At least the drive unit 9 of the carriage 6 is position-controlled.

As shown in FIGS. 1 and 6, the horizontal support beam 8 is disposed on opposite outer walls of the housing 11 of the machine component 2. To this end, it is provided with stands or legs 12, 13 by way of which the horizontal support beam 8 is bolted onto the housing 11.

The housing 11 is preferably an envelope in which the machine component 2 is enclosed and which is set up separately from the machine component. This arrangement prevents vibration transmissions between the machine component 2 and the housing 11. The latter is sufficiently reinforced so that it can reliably carry the transport device 3. In particular, the housing 11 includes an upper longitudinal beam 14 and, in the side areas, vertical columns 15, 16, which are suitable and properly arranged to support the weight of the transport device 3. Preferably the longitudinal beams 14 and the vertical beams 15, 16 include a portal integrated into the walls of housing 11. As a result of the spatial usually block-like shape of the additional supports or reinforcement structures, they can usually not be integrated into the walls of the housing 11 in order to support forces or loads which are effective, for example, horizontally or transverse to the horizontal support carrier 8. (In FIG. 6—normal to the drafting plane). Such additional supports may be integrated, for example, into the walls of the housing 11 such that a frame structure with struts arranged in triangles is provided in the walls, not shown.

As apparent from FIG. 1, the walls of housing 11 includes one or more doors 17, 18 and in the top wall of housing 11 loading or unloading opening 19. The horizontal beam 8 is arranged preferably so as to extend next to the loading and unloading opening. The longitudinal beam 14 is disposed below the horizontal support beam 8 (FIG. 6) and outside the loading and unloading opening 19.

The loader 4 comprises a pivot arm 20 which is preferably rigid and which is supported on the carriage 6 so as to be pivotable about a horizontal axis 21 which extends normal to the horizontal support beam 8. The pivot movement is effected by a suitable electric drive unit 22 which is shown schematically in FIGS. 2 to 4. The pivot arm 20 is preferably angled with a stiff knee 23 provided about in the longitudinal center thereof. At its free end, the pivot arm 20 is provided with a work piece grasper 24 which is capable to engage work pieces 25, such as crankshafts, to transport them to a certain location and to release them, all controlled by a control unit. The work piece grasper 24 is supported at the free end of the pivot arm 20 preferably in such a way that it is pivotable about an axis which extends parallel to the pivot axis of the pivot arm 20. A parallel guide structure, for example in the form of a guide arm 26, is connected to the work piece grasper 24 and a rod 27 connected thereto to provide for a horizontal position of the work piece 25 in any position of the pivot arm 20. The rod 27 may be supported directly on the carriage 6 or on a control device which is supported on the carriage 6.

Figure 2:
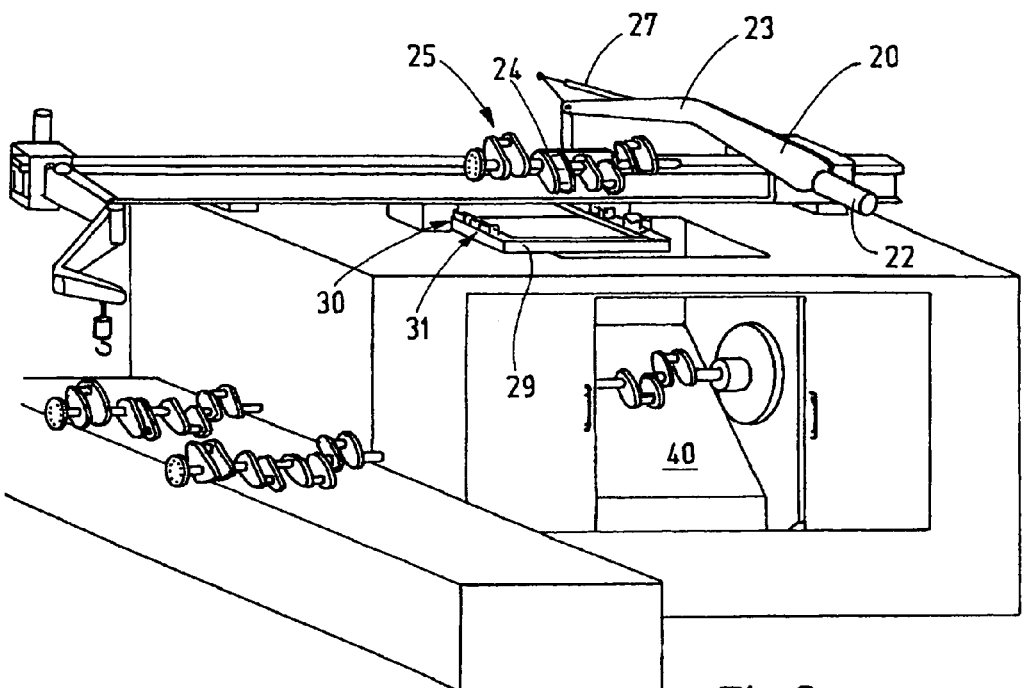
FIGS. 2-5 show the machining arrangement of FIG. 1 in various operational positions in perspective views.

The carriage 6 and, together therewith, the pivot arm 20 and the work piece grasper 24, are movable along the horizontal support beam 8. Associated therewith is a work piece intermediate store 28 which is preferably formed by a carrier 29 which extends horizontally and transverse to the horizontal support beam 8 and which comprises two work piece holding structures 30, 31, as shown in FIG. 2. The holding structures include suitable deposit cavities for accommodating elongated work pieces, for example. The carrier 29 is so adjustable that alternatively arms of the two work piece holding structures 30, 31 can be positioned in the pivot range of the pivot arm 20. The carrier 29 includes an operating unit, for example, in the form of a servo-motor which is controlled in coordination with the other drive units of the loader 4.

Like the carriage 6, also the carriage 7 of the crane 5 is movable along the horizontal support beam 8. The carriage 7 has an arm 32 with two or more joints 33, 34. The joints 33, 34 have vertical pivot axes. The joints 33, 34 are preferably freely movable so that the arm 32 can be moved manually. Alternatively, the joints 33, 34 may be provided with drive units or with locking devices so as to permit an operator to freely pivot the arm or to lock the arm in position. At this free end of the arm 32, there is a hoist 35 with a lock hook 36 moved up and down by the hoist. For operating the crane 5 particularly for controlling the drive 10 and the hoist 35 a hand operator 37 may be provided which is in communication with the crane via a cable or in a wireless way.

As shown in FIGS. 1 to 6, the horizontal support beam 8 extends on one side beyond the housing 11 and over a loading location 38 which is disposed at one end of a storage and transport arrangement 39. The storage and transport arrangement 39 may be, for example, an endless transport structure with work piece support locations and which cooperates at one end with the loader 4, particularly the work piece grasper 24 and is manually accessible at the other end.

The machining structure 1 described above operates as follows: For the explanation reference is first made to FIG. 7, which shows the machining structure schematically. The storage and transport arrangement 39 includes deposit locations a, b, c, d (as well as additional locations which are not shown) which are marked by dash-dotted lines indicating the axis of rotation of a work piece in the exemplary form of a crankshaft.

Figure 7:
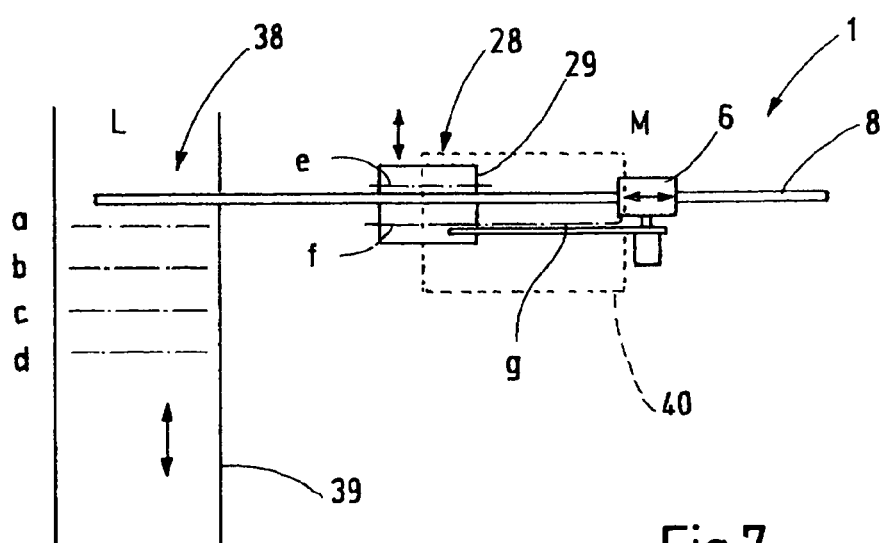

The carrier 29 includes work piece storage locations which are designated by letters e and f. Furthermore, in FIG. 7, the working space 40 of the machine component 2 is schematically shown. FIG. 6 shows work piece holding tools 41, 42 which firmly engage the work piece 25 in a machining position within the working space 40. A work piece 25 being machined is shown in FIG. 7 by a dash-dotted line g.

Figure 3:
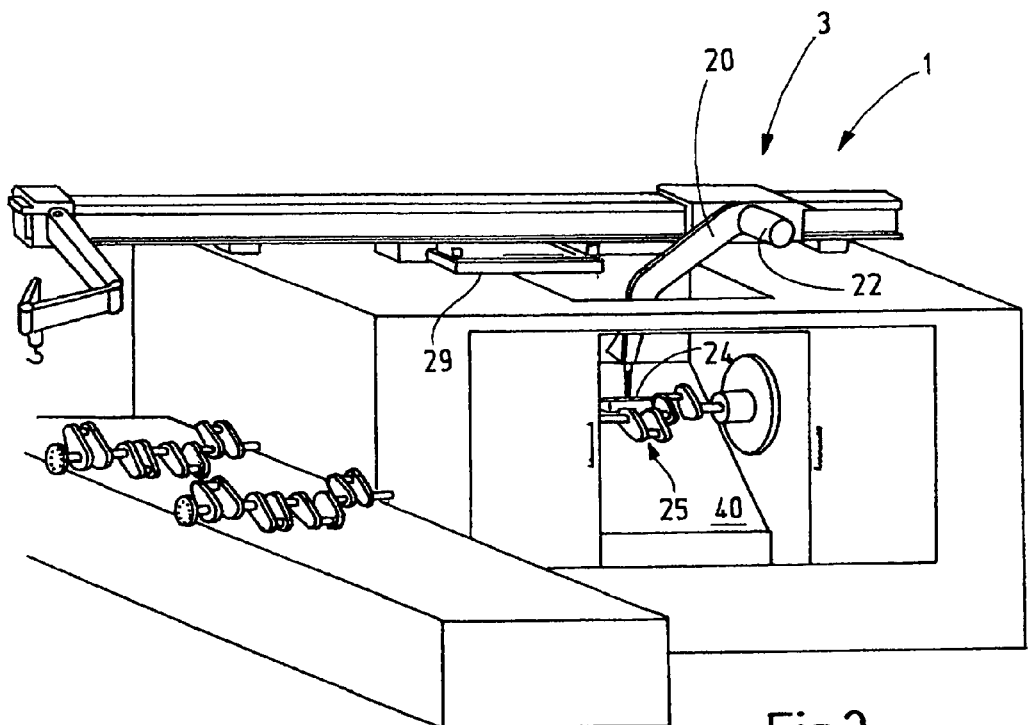
Figure 4:
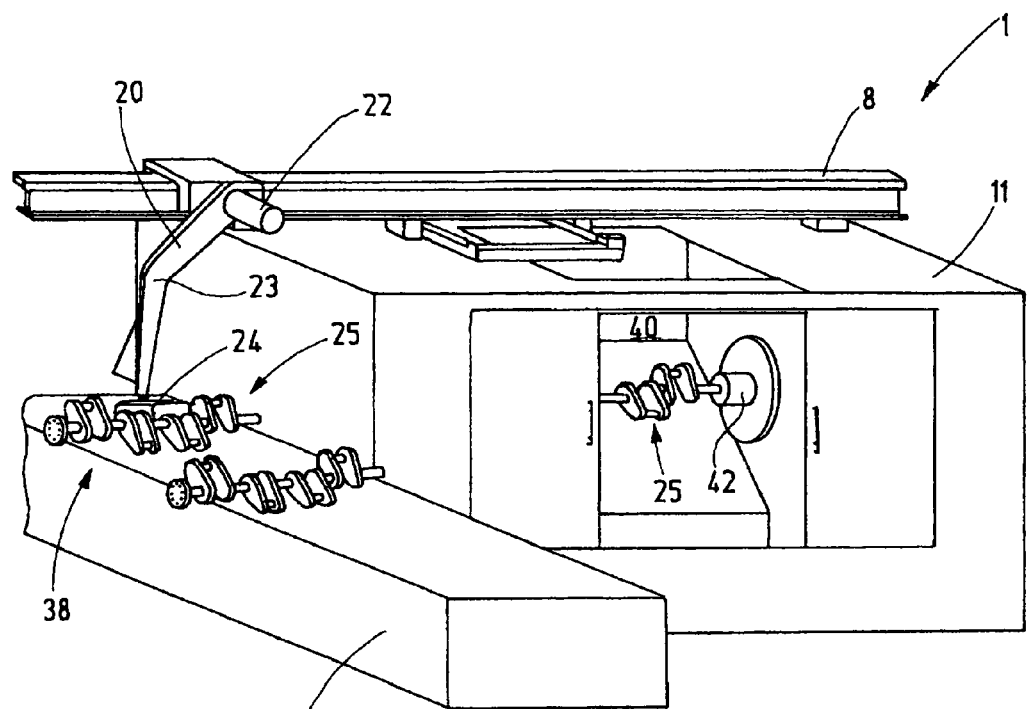

To explain the procedure, it is first assumed that an unfinished work piece to be machined is disposed in the position e while the position f is empty. The dash-dotted line g represents a finished work piece. The finished work piece is now picked up by the loader 4 in that the pivot arm 2, as shown in FIG. 3, is pivoted into the working space 40 and grasps the work piece 25. The clamping means 41, 42 are opened. The loader 4 can then lift the work piece 25 out of the working space 40 and deposit it on the work piece holding structure 31 (position f in FIG. 7).

Then the carrier 29 is moved transversely so that the position e assumes the location previously held by the position f. The position c is now in the range of the grasper 24 which engages the new work piece and moves it into the working space 40. This occurs in the machine position M, in which the work piece grasper 24 cooperates with the work piece intermediate storage structure 28 and also can reach into the working space 40. If necessary not only the pivot arm 20 is pivoted, but the carriage 6 is also moved slightly along the horizontal support beam 8.

When the new work piece 25 is received by the clamping means 41, 42, the pivot arm 20 is pivoted out of the working area 40 and the machining of the work piece 25 is initiated.

While the work piece is being machined the loader 4 transports the finished work piece from the intermediate work piece holding structure 31 to the loading location 38. To do this, the carrier 29 of the work piece intermediate storage structure 28 is moved so that the work piece deposited in the position f is again returned to the pivot range of the grasper and can be grasped by the grasper 24. When the work piece is firmly engaged, the carriage 6 moves along the horizontal support beam 8 until the work piece grasper is disposed above the storage location 38. Here the finished work piece may be deposited for example at the position a. The storage and transport device 39 may then be operated so as to move a new unfinished work piece to the location a. This work piece is then grasped by the work piece grasper 24 and moved to the intermediate work piece storage structure 28 where it is deposited at the location e. When the machining of the work piece 25 in the working space 40 is completed the work piece change-over procedure can be repeated as described above.

Occasionally an action or intervention concerning the machine component 2 may be necessary which requires the aid of the crane 5. Such a situation is shown in FIG. 5 wherein the loader 4 has been omitted for clarity. If loader 4 is not necessary, it may be sufficient to provide only the crane 5 and actually omit the loader 4. As apparent, the carriage 7 which is normally parked in the loading area 38 may be moved by the hand-held operating unit 37 to the machine position 19. Using the load hook 36, heavy objects such as tools—FIG. 5 shows an internal metal cutter 43—can be picked up by the crane and moved away from the machine component. It is of course, also possible to introduce heavy tools such as the internal metal cutter 43 into the working space 40 with the aid of the crane 5 and to properly position them in the working space 40 for connection to the machine component 2.

An improved arrangement includes a horizontal support beam 8 with a carriage arrangement 3 including both a loader 4 and a crane 5 or only the loader or only the crane 5. The horizontal support beam is supported on the machine housing 11 which preferably fully encloses the machine component 2. Preferably the loader 4 comprises a jointless, that is stiff, pivot arm 20 which can be pivoted from above into the working space 40. The loader 4 is preferably assigned to an intermediate storage structure 28 which is horizontally movably supported and arranged in such a position that the loader 4 can move work pieces from the intermediate storage structure 28 into the working space 40 without major displacement of the carriage 6. In other words, the work piece maintaining location in the working space 40 and the corresponding storage position of the work piece on the intermediate storage structure 28 are preferably both disposed on the arc defined by the free end of the pivot arm around the pivot arms of the pivot arm 20 on the carriage 6.

The overall configuration of the machine tool and the associated handling arrangement as described herein is robust, requires relatively little space, is relatively inexpensive and provides for the shortest possible work piece exchange times.

What is claimed is:

1. A machine tool arrangement (1) including a machining structure comprising a machine tool component (2) including at least one mounting structure (41, 42) for at least one work piece (25) to be machined by a suitable metal cutting tool (43) supplied in said machine tool component (2), and positioning and drive means for generating relative motion between the cutting tool (43) and the work piece (25) for machining the work piece (25), a housing (11) enclosing the machine component (2), and a work piece loader and transport structure (4) including a horizontal support beam (8) supported above the housing (11) and horizontal support beam (8) being supported by the housing (11) and extending over machine component (2).

2. A machine tool arrangement according to claim 1, wherein the housing (11) is an enclosure in which the machine component (2) is disposed and which extends over the machine component (2), but the housing (11) is set up independently of the machine component (2).

3. A machine tool arrangement according to claim 1, wherein the horizontal support beam (8) extends at least at one end thereof beyond the housing (11).

4. A machine tool arrangement according to claim 3, wherein the horizontal support beam (8) extends beyond the housing (11) in a cantilevered fashion.

5. A machine tool arrangement according to claim 4, wherein a loading area (38) is provided below the cantilevered extension of the horizontal support beam (8).

6. A machine tool arrangement according to claim 4, further including at least one of a carriage (6) and a carriage (7) supported by the horizontal support beam (8) so as to be longitudinally movable thereon between a machine position (M) and an end position (L).

7. A machine tool arrangement according to claim 6, wherein the carriage (7) includes a manually controlled crane (5) supported by the cantilevered extension of the horizontal support beam (8).

8. A machine tool arrangement according to claim 6, wherein the carriage (6) includes a pivot arm (20).

9. A machine tool arrangement according to claim 8, wherein the pivot arm (20) is supported so as to be pivotable about a horizontal axis and is connected to a drive device (9).

10. A machine tool arrangement according to claim 8, wherein the pivot arm (20) carries at its free end a work piece grasper (24).

11. A machine tool arrangement according to claim 10, further including an intermediate work piece storage structure (28) provided in the area of the machine position (M) near the machine tool component (2) and the intermediate work piece storage structure 28 positioned above the housing (11) and having at least two storage spaces (30, 31) for accommodating work pieces (25) thereon.

12. A machine tool arrangement according to claim 11, wherein the intermediate work piece storage structure (28) includes a carrier (29) which is movable horizontally transverse to the horizontal support beam (8) and which includes means for temporarily accommodating the work pieces (25).

13. A machine tool arrangement according to claim 10, wherein the work piece grasper (24) is pivotally supported on the pivot arm by a parallel guide structure.

14. A machine tool arrangement according to claim 8, wherein the pivot arm (20) is a single component.

15. A machine tool arrangement according to claim 1, wherein the housing (11) is provided at its top with a loading opening (19).

16. A machine tool arrangement (1) comprising a machine component (2) including at least one mounting structure (41, 42) for at least one work piece (25) to be machined by a suitable cutting tool (43) supported in the machine tool component (2) and positioning and drive means for generating relative motion between the cutting tool (43) and the work piece (25) for machining the work piece (25), a work piece loader and transport structure (4) including a horizontal support beam (8) extending over the machine component (2), a carriage (6) supported on the transverse horizontal support beam (8) so as to be longitudinally movable between a machine position (M) and an end position (L), a pivot arm (20) with a work piece grasper (24) pivotally supported on the carriage (6) and an intermediate work piece storage structure (28) provided in the area of the machine position (M) near the machine tool component (2) and above the machine tool component (2) and having at least two storage spaces (30, 31) for accommodating work pieces (25) thereon.

17. A machine tool arrangement (1) according to claim 16, wherein the intermediate work piece storage structure (28) includes a carrier (29) which is movable horizontally transverse to the horizontal beam (8) and which includes means for temporarily accommodating work pieces (25).

18. A machine tool arrangement (1) according to claim 17, wherein the pivot arm (20) is supported so as to be pivotable about a horizontal axis and is provided with a drive unit (9).

19. A machine tool arrangement (1) according to claim 17, wherein the pivot arm (20) is a single component.

20. A machine tool arrangement (1) according to claim 17, wherein the work piece grasper (24) is pivotally supported on the pivot arm (20) by a parallel guide structure.

* * * * *